United States Patent …

(12) United States Patent
Youngblood

(10) Patent No.: US 7,103,178 B2
(45) Date of Patent: Sep. 5, 2006

(54) SPEECH AMPLIFIER-RESIDENT MECHANISM FOR CONTROLLABLY SUPPLYING POWER TO A LINE CIRCUIT

(75) Inventor: Douglas L. Youngblood, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 81 days.

(21) Appl. No.: 10/887,935

(22) Filed: Jul. 9, 2004

(65) Prior Publication Data
US 2006/0008077 A1   Jan. 12, 2006

(51) Int. Cl.
*H04M 19/00*   (2006.01)
(52) U.S. Cl. .................. 379/413; 379/324; 379/377
(58) Field of Classification Search ......... 330/133
See application file for complete search history.

(56) References Cited
U.S. PATENT DOCUMENTS 4,709,388 A * 11/1987 Defretin ............... 379/413
4,866,768 A * 9/1989 Sinberg ............... 379/413
4,961,222 A   10/1990 Johansson et al. .......... 379/413
5,557,672 A * 9/1996 Perry et al. ............... 379/413

\* cited by examiner

*Primary Examiner*—Daniel Swerdlow
(74) *Attorney, Agent, or Firm*—Allen, Dyer, Doppelt, Milbrath & Gilchrist, P.A.

(57) ABSTRACT

A voltage-coupling and loop current supply mechanism controllably turns on an output transistor within the tip amplifier circuitry portion of the speech amplifier to controllably apply a prescribed voltage to the telephone line during on-hook/standby mode. This controllably applied voltage serves as a source of loop current when the phone goes off-hook. The ring lead portion of the tip/ring wireline pair is connected to a controlled current sink, which is coupled to the output of a voltage regulator referenced to the battery voltage. This controlled current sink is used to sink a prescribed loop current from the tip/ring pair when the phone goes off-hook. When the phone goes off-hook and loop current is detected, the voltage-supply mechanism provided by the tip amplifier's output transistor is terminated, and the speech amplifier is placed in its normal speech amplifier mode.

26 Claims, 1 Drawing Sheet

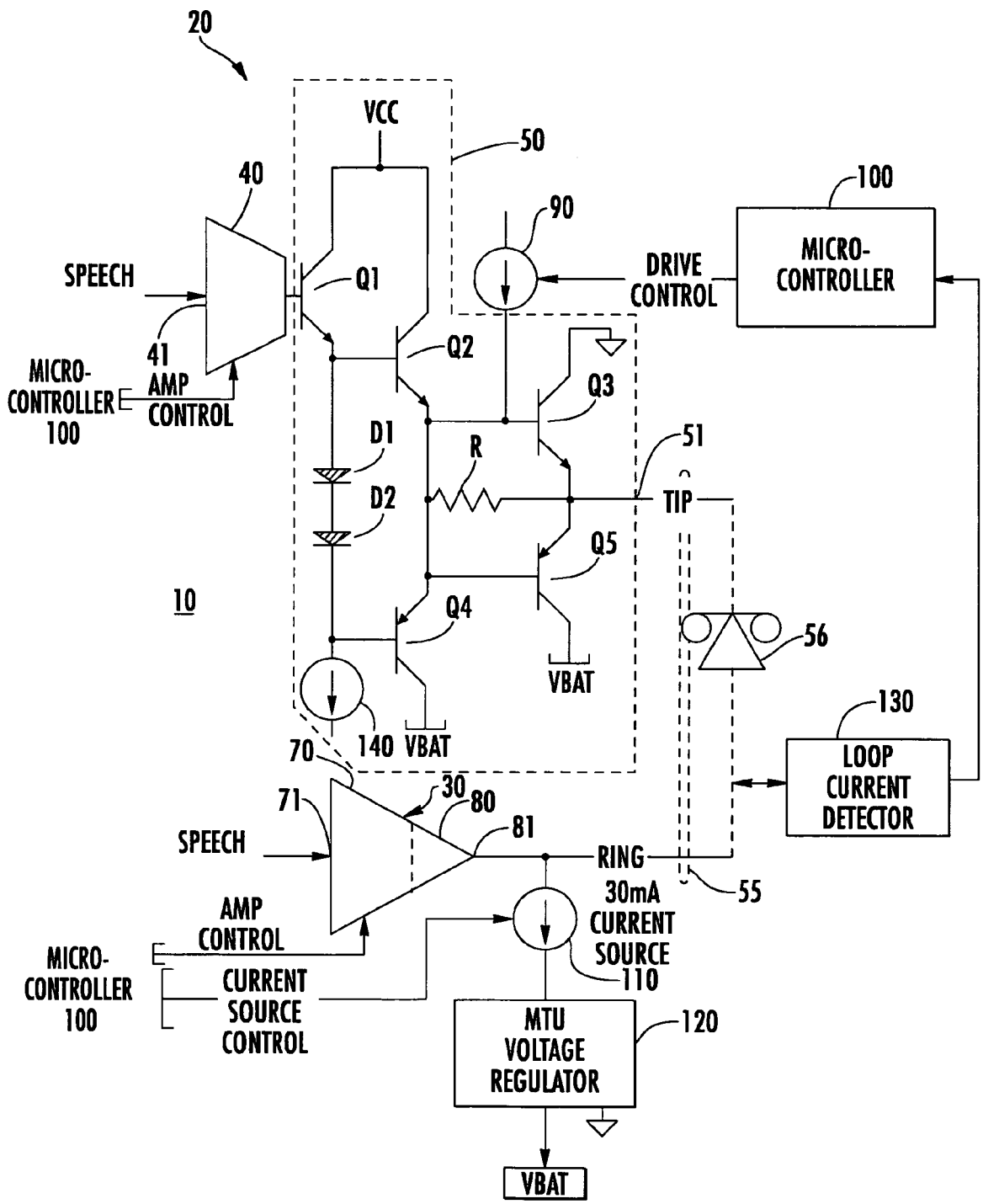

ly directed to the use of the output stage of a telecommunication circuit device's speech amplifier circuitry to supply a voltage to the telephone line during on-hook (low power, standby) mode of operation of the device, to source loop current from that same stage of the speech amplifier circuitry in response to the device going off-hook, and thereafter enable normal amplification operation of the speech amplifier circuitry during the off-hook condition of the device.
SPEECH AMPLIFIER-RESIDENT MECHANISM FOR CONTROLLABLY SUPPLYING POWER TO A LINE CIRCUIT

FIELD OF THE INVENTION

The present invention relates in general to telecommunication circuits and components therefor, and is particularly directed to the use of the output stage of a telecommunication circuit device's speech amplifier circuitry to supply a voltage to the telephone line during on-hook (low power, standby) mode of operation of the device, to source loop current from that same stage of the speech amplifier circuitry in response to the device going off-hook, and thereafter enable normal amplification operation of the speech amplifier circuitry during the off-hook condition of the device.

BACKGROUND OF THE INVENTION

Present day subscriber line circuits (SLICs) customarily employ some form of low power, standby mode of operation to provide a prescribed voltage to the subscriber line when the subscriber's telephone is in its on-hook condition, and to provide current to the phone when the subscriber takes the phone off-hook, so that current-sensing circuitry can detect the flow of loop current and thereby the off-hook condition of the phone. The loop and phone resistance is typically on the order of 200 ohms, and the supplied voltage may be on the order of −42V to −56V. This implies the need for current-limiting, in order to prevent damage to the SLIC. In the past this has been accomplished by a set of switching circuit components, in the form of relatively large (high current demand rated) transistors and associated resistors dedicated for the purpose, namely, circuitry that is separate and distinct from that of the speech amplifier. These speech circuit add-on components undesirably increase the complexity and cost of the SLIC.

SUMMARY OF THE INVENTION

In accordance with the present invention, these and other shortcomings of conventional voltage supply and loop current detection schemes are effectively obviated by a new and improved speech amplifier-resident voltage-coupling and loop current supply mechanism, that uses the output stage of the speech amplifier circuitry to apply a prescribed voltage to the telephone line during on-hook/standby mode, so as to enable loop current detection circuitry to detect when the phone transitions from its on-hook state to its off-hook state. Once loop current has been detected, the voltage-supply mechanism is terminated, and that portion of the output stage of the speech amplifier that had been used to source loop current is placed in its normal speech amplifier mode.

The speech amplifier circuitry includes a tip amplifier and a ring amplifier, each containing a front end gain stage to which signals to be amplified are applied, and an output stage, by way of which amplified telecommunication (e.g., speech) signals are coupled to a telecommunication wireline tip/ring pair. Except for connections of controlled current sources in accordance with the invention, the front end and output stages of the tip and ring amplifiers are the identically configured. The tip amplifier's output stage includes an output transistor, which has its emitter coupled to the tip line, and its the collector coupled to a source of reference potential (e.g., ground).

Pursuant to one aspect of the invention, the base of the tip amplifier's output transistor is also coupled to a first controlled current source. This current source is controllably enabled or turned on during the on-hook, standby mode of operation of the speech amplifier. The current output of this controlled current source serves to supply a base current that is sufficient to turn on the tip amplifier's output transistor, so that the (ground) reference potential at the collector of this output transistor is coupled to its emitter and thereby to the TIP lead during the on-hook condition of the phone. Coupling the TIP terminal to ground during on-hook mode maintains the TIP lead coupled to a reference voltage that effectively serves to provide a standby source of loop current for the tip/ring wireline pair.

As a further feature of the invention, the RING lead portion of the tip/ring wireline pair, to which the output of the ring amplifier is coupled, is connected to a second controlled current source, which serves as a current sink for loop current, as will be described. The output of the second controlled current source is coupled to a ground-referenced voltage regulator which is sourced by the battery voltage. This second controlled current source is used to sink a prescribed loop current from the tip/ring pair when the phone goes off-hook. As long as the phone is on-hook, however, there is no closed circuit path through the tip/ring pair, so that no current flows through the second current source. Namely, during on-hook mode, the second controlled current source is in voltage compliance or 'ready' to sink loop current sourced from the turned on output transistor within the tip amplifier.

When the phone goes off-hook, a circuit path is provided from the tip terminal TIP through the phone and back to the ring terminal RING. The TIP terminal is connected to ground through the turned-on output transistor in the tip side speech amplifier's output stage, and the RING terminal is effectively coupled through the second current source to the output voltage provided by a voltage regulator. This results in the flow of loop current, which is detected by a loop current detector coupled to the tip-ring path. In response to detection of loop current, the speech amplifier's microcontroller disables each of the first and second current sources, and enables the circuitry of the tip and ring amplifiers, so that both the tip and ring amplifiers may amplify speech signals for application to the tip/ring pair.

At the termination of the call, the phone goes back on-hook, interrupting the loop current path. The termination of loop current is detected by the loop current detector, which signals the microcontroller. In response to the absence of loop current, the microcontroller once again disables the amplifier circuitry within each of the tip and ring speech amplifier's input and output stages. It also enables the first and second controlled current sources, thereby placing the speech amplifier circuitry in the on-hook, standby mode.

BRIEF DESCRIPTION OF THE DRAWINGS

The single FIGURE is a diagrammatic illustration of the speech circuit-resident, voltage-coupling and loop current-sourcing mechanism of the present invention.

DETAILED DESCRIPTION

Before describing the speech circuit-resident, voltage-coupling and loop current-sourcing mechanism of the present invention, it should be observed that the invention resides primarily in a novel arrangement of conventional telecommunication circuits and components therefor. In a practical implementation that facilitates packaging this circuitry in a hardware-efficient equipment configuration, these modular arrangements may be readily implemented as field programmable gate array (FPGA)-, or application specific integrated circuit (ASIC)-based chip sets. Consequently, the configuration of such an arrangement of circuits and components and the manner in which they are interfaced with one another have, for the most part, been illustrated in the drawings by readily understandable block diagrams and associated schematic symbols, which show only those specific details that are pertinent to the present invention, so as not to obscure the disclosure with details which will be readily apparent to those skilled in the art having the benefit of the description herein. The diagrammatic illustration is primarily intended to show the major components of the invention in a convenient functional grouping, whereby the present invention may be more readily understood.

Attention is now directed to the single FIGURE, wherein the speech circuit-resident, voltage-coupling and loop current-sourcing mechanism of the present invention is shown as comprising speech amplifier circuitry 10, that includes a tip amplifier 20 and a ring amplifier 30, each of which is of conventional configuration, containing a front end gain stage to which signals to be amplified are applied, and an output stage by way of which amplified signals are coupled to a telecommunication link.

More particularly, tip amplifier 20 includes a front end gain stage 40 and an output stage 50. Front end gain stage 40 has a signal input 41 that is coupled to receive telecommunication (e.g., speech) signals to be amplified, while output stage 50 (internal circuitry of which is shown in detail and will be described below) has an output 51, from which amplified telecommunication signals are applied to a tip portion TIP of a telecommunication wireline pair 55, to which a telecommunication circuit device (e.g., telephone 56 is coupled). Similarly, ring amplifier 30 includes a front end gain stage 70 and an output stage 80. The front end gain stage 70 of the ring amplifier has signal input 71 coupled to receive signals to be amplified, while output stage 80 has an output 81, from which amplified telecommunication signals are applied to a ring portion RING of the telecommunication wireline pair 55. As noted above, except for connections of controlled current sources in accordance with the invention, these stages are configured identically to the respective front end and output stages of the tip amplifier. Since the present invention makes use of circuitry of the output stage of only the tip amplifier, while the ring amplifier is used in a conventional manner, the output stage of the ring amplifier has not been shown in detail, so as to reduce the complexity of the drawings.

The tip amplifier's output stage 50 is configured as a complementary bipolar push-pull architecture, comprising an NPN transistor Q1, which has its base coupled to the output of front end gain stage 40 and its collector couple to the VCC voltage rail. The emitter of transistor Q1 is coupled to the base of NPN transistor Q2, the collector of which is coupled to the VCC rail and the emitter of which is coupled to the base of NPN output transistor Q3. The commonly connected emitter of transistor Q1 and base of transistor Q2 are coupled through series-connected diodes D1 and D2 to the base of PNP transistor Q4 and controlled current source 140. PNP transistor Q4 has its collector coupled to a battery voltage terminal VBAT (typically on the order of −48V to −100V), while its emitter is coupled in common with the emitter of NPN transistor Q2, one end of a resistor R, and the base of a PNP output transistor Q5. The collector of output transistor Q5 is coupled to the battery voltage terminal VBAT, while its emitter is coupled to the tip amplifier output terminal TIP. A second end of resistor R and the emitter of output transistor Q3 are also coupled to the output terminal TIP. The collector of output transistor Q3 is coupled to a prescribed voltage reference terminal (e.g., ground, as shown).

In accordance with the present invention, the base of output transistor Q3 within the tip amplifier (but not the ring amplifier) is further coupled to a controlled current source 90. As described briefly above, the speech amplifiers' digital controller 100 is operative to turn on controlled current source 90 during the on-hook, standby mode of operation of the speech amplifier. This current output of current source 90 serves to supply a base current to and turn on output transistor Q3, so that the (ground) reference potential at the collector of output transistor Q3 is coupled to the TIP terminal during the on-hook condition of the phone. Coupling the TIP terminal to ground in this manner effectively provides a standby source of current for TIP/RING wireline pair 55.

As a further feature of the invention, the ring portion RING of the TIP/RING wireline pair 55, to which the output of ring amplifier 30 is coupled, is connected to a controlled current source 110, which serves as a current sink for loop current, as will be described. The output of controlled current source 110 is coupled to a voltage regulator 120, which is coupled to the VBAT terminal. Like controlled current source 90, which is connected to the output stage 50 of the TIP side speech amplifier 20, as described above, controlled current source 110 is controlled by the speech amplifiers' digital controller 100 and is controllably turned on during the on-hook, standby mode of operation of the speech amplifier. As will be detailed below, current source 110 is used to sink a prescribed loop current (e.g., on the order of 30 ma) from the tip/ring pair 55 when the phone goes off-hook. As long as the phone is on-hook, there is no closed circuit path through the tip ring pair, so that no current flows through the current source 110. The speech amplifier-resident, voltage-coupling and loop current-sourcing mechanism of the present invention operates as follows.

On-Hook, Standby Mode

During this mode, the speech amplifiers' microcontroller 100 disables the amplifier transistor circuitry within each of the tip and ring speech amplifier's input and output stages including current source 140, so that both the tip and ring amplifiers are in a quiescent or standby state. Also, since the phone 56 is on-hook, there is no circuit path through the tip/ring pair 55, so that no loop current flows in the tip/ring pair. However, pursuant to the invention, the microcontroller 100 supplies enabling signals to each of the controlled current source 90, that is coupled to the base of output transistor Q3 in the output stage 50 of the tip amplifier, and the controlled current source 110, that is coupled to the ring terminal RING on the ring amplifier side of the tip/ring amplifier pair.

With the current source 90 being enabled, the base of output transistor Q3 receives sufficient current drive to turn on the output transistor Q3. With output transistor Q3 turned on, the ground reference potential at the collector of output transistor Q3 is coupled to its emitter and thereby to the TIP side of the wireline pair 55. Coupling the TIP terminal to ground in this manner effectively provides a standby source of loop current for the TIP/RING wireline pair 55. Loop current does not yet flow however, since the on-hook condition of the phone prevents a closed circuit path from being established through the wireline pair.

On the ring terminal side, with an enabling signal being coupled to its control input, current source 110 is 'ready' to sink loop current sourced from output transistor Q3 within the tip amplifier's output stage 50. It does not actually sink current during this mode, since the phone is on-hook, interrupting a circuit path between the TIP and RING terminals.

Off-Hook Mode

When the phone goes off-hook, a circuit path is provided through the tip/ring pair 55, from the tip terminal TIP through the phone and back to the ring terminal RING. Since the TIP terminal is connected to ground through turned-on transistor Q3 in the tip amplifier's output stage 50, and since the RING terminal is effectively coupled through the compliant current source 110 to the output voltage (e.g., on the order of −42V to −56V) provided by voltage regulator 120, current can now flow. The current flow path is as follows: ground—the collector-emitter path of transistor Q3 in the tip amplifier's output stage 50—tip lead TIP—phone 56—ring lead RING-enabled current source 110 on the ring side of the tip/ring amplifier pair—voltage regulator 120—VBAT (e.g., −48V to −100V).

As loop current of a prescribed magnitude (e.g., 25 mA) begins to flow, it is detected by a loop current detector 130 coupled to the tip-ring path signals the microcontroller 100. In response to the detection of loop current, the microcontroller 100 disables each of current source 90 within the tip amplifier and current source 110 on the ring side of the loop. It then enables the amplifier circuitry within each of the tip and ring amplifier's input and output stages including controlled current source 140, so that both the tip and ring amplifiers may amplify speech signals supplied thereto for application to the tip/ring pair 55. At the termination of the call, the phone goes back on-hook, thereby interrupting the loop current path. The lack of loop current is detected by the loop current detector, which signals the microcontroller of this occurrence. In response to the absence of loop current, the microcontroller, if so programmed, may once again disable the amplifier circuitry within each of the tip and ring amplifier's input and output stages, by disabling current source 140. It also enables each of current sources 90 and 110, thereby placing the speech amplifier circuitry in the on-hook, standby mode, described above.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. An apparatus for controllably supplying power to a line circuit that couples telecommunication signals to a telephone line comprising:

a tip amplifier and a ring amplifier, coupled to said telephone line, each of said tip amplifier and said ring amplifier including signal amplification circuitry that is operative to amplify telecommunication signals for application to said telephone line, and wherein only one of said tip amplifier and said ring amplifier contains loop current supply circuitry which is controllably operative to couple a source of loop current to said telephone line, while the other of said tip amplifier and said ring amplifier contains no loop current supply circuitry; and a control circuit, which, for an on-hook condition of a telecommunication circuit device coupled to said telephone line, is operative to disable said other of said tip amplifier and said ring amplifier, and to disable signal amplification circuitry of said only one of said tip amplifier and said ring amplifier, and to enable said loop current supply circuitry of said only one of said tip amplifier and said ring amplifier and thereby cause said loop current supply circuitry to couple said source of loop current to said telephone line, so that, in response to said telecommunication circuit device transitioning from said on-hook condition to an off-hook condition, loop current may flow from said loop current supply circuitry through said telephone line, and wherein said control circuit is further operative to enable operation of signal amplification circuitry of each of said tip amplifier and said ring amplifier, in response to said telecommunication circuit device transitioning from said on-hook condition to an off-hook condition.

2. The apparatus according to claim 1, wherein said control circuit is operative, in response to detection of the flow of loop current through said telephone line as a result of said telecommunication circuit device transitioning from said on-hook condition to an off-hook condition, to disable said loop current supply circuitry and thereby prevent loop current from being coupled thereby to said telephone line, and to enable operation of signal amplification circuitry of each of said tip amplifier and said ring amplifier.

3. The apparatus according to claim 1, wherein each of said tip amplifier and said ring amplifier has a front end gain stage to which said telecommunication signals are applied, and an output stage adapted to be coupled to said telephone line, and wherein said current supply circuitry resides in the output stage of said only one of said tip amplifier and said ring amplifier.

4. The apparatus according to claim 3, wherein the output stage of said only one of said tip amplifier and said ring amplifier comprises a transistor circuit, and wherein said source of loop current is coupled to said telephone line by way of said transistor circuit.

5. The apparatus according to claim 4, wherein said transistor circuit includes a line driver transistor through which amplified telecommunication signals are applied to said telephone line, and wherein said source of loop current is coupled to said telephone line through said line driver transistor.

6. The apparatus according to claim 5, wherein the output stage of said only one of said tip amplifier and said ring amplifier further includes a controlled current source coupled to said line driver transistor, and wherein said control circuit is operative, in response to said telecommunication circuit device being in said on-hook condition, to cause said controlled current source to turn on said line driver transistor, so as to couple said source of loop current through said line driver transistor to said telephone line.

7. The apparatus according to claim 6, further comprising a controlled current sink that is controllably operative to allow a prescribed loop current to flow through said telephone line, and wherein said control circuit is operative, in response to detection of the flow of loop current, to turn off said controlled current source and said controlled current sink, and to enable signal amplification circuitry of each of said tip and ring amplifiers for the amplification of said telecommunication signals thereby.

8. The apparatus according to claim 1, further comprising a controlled current sink that is controllably operative to allow a prescribed loop current to flow through said telephone line.

9. The apparatus according to claim 8, wherein said control circuit is operative to enable said controlled current sink for said on-hook condition of said telecommunication circuit device, so that, in response to said telecommunication circuit device transitioning from said on-hook condition to an off-hook condition, said controlled current sink will sink said prescribed loop current.

10. The apparatus according to claim 9, wherein said control circuit is operative, in response to said telecommunication circuit device going off-hook, but prior to said tip and ring amplifiers being enabled for amplification of telecommunication signals thereby, to enable said controlled current sink to sink said prescribed loop current.

11. The apparatus according to claim 8, further comprising a voltage regulator, to which said controlled current sink is coupled, referenced to a prescribed voltage.

12. In an apparatus for controllably supplying power to a line circuit that couples telecommunication signals to a telephone line comprising, said line circuit including a tip amplifier, adapted to be coupled to a tip portion of said telephone line, and being controllably operative to couple and amplify communication signals for application to said tip portion of said telephone line, and a ring amplifier adapted to be coupled to a ring portion of said telephone line, and being controllably operative to couple and amplify communication signals for application to said ring portion of said telephone line, the improvement wherein:
  only one of said tip and ring amplifiers includes loop current-sourcing circuitry that is controllably operative, for an on-hook condition of a telecommunication circuit device coupled to said telephone line, to apply a prescribed voltage to and thereby provide a source of loop current for said telephone line, whereas signal amplification circuitry of both of said tip and ring amplifiers are disabled for said on-hook condition of said telecommunication circuit device, and are operative, in response to said telecommunication circuit device transitioning from said on-hook condition to an off-hook condition, to amplify communication signals for application to paid telephone line.

13. The improvement according to claim 12, including a control circuit, which is operative, in response to detection of the flow of loop current through said telephone line as a result of said telecommunication circuit device transitioning from said on-hook condition to an off-hook condition, to disable said loop current-sourcing circuitry and thereby prevent said loop current-sourcing circuitry from applying said prescribed voltage to said telephone line and, in response to said telecommunication circuit device transitioning from said on-hook condition to an off-hook condition, to enable both of said tip and ring amplifiers to amplify communication signals for application to said telephone line.

14. The improvement according to claim 13, further comprising a controlled current sink that is controllably operative to sink a prescribed loop current flowing through said telephone line, and wherein said control circuit is operative to enable said controlled current sink for said on-hook condition of said telecommunication circuit device, so that, in response to said telecommunication circuit device transitioning from said on-hook condition to an off-hook condition, said controlled current sink will sink said prescribed loop current.

15. The improvement according to claim 14, wherein said control circuit is operative, in response to said telecommunication circuit device going off-hook, but prior to said tip and ring amplifiers being enabled for amplification of telecommunication signals thereby, to enable said controlled current sink to sink said prescribed loop current.

16. The improvement according to claim 14, further comprising a voltage regulator, to which said controlled current sink is coupled, referenced to a prescribed voltage.

17. The improvement according to claim 12, wherein each of said tip amplifier and said ring amplifier bas a front end gain stage to which said telecommunication signals are applied, and an output stage adapted to be coupled to said telephone line, and wherein said loop current-sourcing circuitry resides in the output stage of said only one of said tip amplifier and said ring amplifier.

18. The improvement according to claim 17, wherein the output stage of said only one of said tip amplifier and said ring amplifier comprises a line driver transistor through which amplified telecommunication signals are applied to said telephone line, and wherein said source of loop current is supplied to said telephone line through said line driver transistor, and wherein the output stage of said only one of said tip amplifier and said ring amplifier further includes a controlled current source coupled to said line driver transistor, and wherein said control circuit is operative, in response to said telecommunication circuit device being in said on-hook condition, to cause said controlled current source to turn on said line driver transistor, so as to causes said source of loop current to be coupled through said line driver transistor to said telephone line.

19. The improvement according to claim 18, further comprising a controlled currant sink that is controllably operative to sink a prescribed loop current flowing through said telephone line, and wherein said control circuit is operative, in response to detection of the flow of loop current, to turn off said controlled current source and said controlled current sink, and to enable signal amplification circuitry of each of said tip and ring amplifiers for the amplification of said telecommunication signals thereby.

20. A method for controllably supplying power to a line circuit that couples telecommunication signals to a telephone line, said line circuit including a tip amplifier, adapted to be coupled to a tip portion of said telephone line, and being controllably operative amplify communication signals for application to said tip portion of said telephone line, and a ring amplifier adapted to be coupled to a ring portion of said telephone line, and being controllably operative to amplify communication signals for application to said ring portion of said telephone line, said method comprising the steps of;
  (a) for an on-hook condition of a telecommunication circuit device coupled to said telephone line, disabling operation of signal amplification circuitry of both said tip amplifier and said ring amplifier, and causing only one of said tip amplifier and said ring amplifier to couple a source of loop current to said telephone line; and
  (b) in response to said telecommunication circuit device transitioning from said on-hook condition to an off-hook condition, allowing the flow of loop current through said telephone line, and enabling operation of signal amplification circuitry of each of said tip amplifier and said ring amplifier.

21. The method according to claim 20, wherein step (a) further comprises enabling said line circuit to controllably sink a prescribed loop current flowing through said telephone line from said source of loop current when said telecommunication circuit device goes off-hook.

22. The method according to claim 20, wherein step (b) comprises, in response to detection of the flow of loop current through said telephone line as a result of said telecommunication circuit device transitioning from said on-hook condition to an off-hook condition, preventing said only one of said tip amplifier and said ring amplifier from coupling said source of loop current to said telephone line, and causing both of said tip and ring amplifiers to amplify communication signals for application to said telephone line.

23. The method according to claim 20, wherein each of said tip amplifier and said ring amplifier has a front end gain stage to which said telecommunication signals are applied, and an output stage adapted to be coupled to said telephone line, and wherein step (a) comprises coupling said source of loop current to said telephone line by way of the output stage of said only one of said tip amplifier and said ring amplifier.

24. The method according to claim 23, wherein the output stage of said only one of said rip amplifier and said ring amplifier comprises a line driver transistor through which amplified telecommunication signals are applied to said telephone line, and a controlled current source coupled to said line driver transistor, and wherein step (a) comprises, in response to said telecommunication circuit device being in said on-hook condition, turning on said line driver transistor in accordance with current from said controlled current source, so as to cause said source of loop current to be coupled through said line driver transistor to said telephone line.

25. The method according to claim 24, further comprising a controlled current sink that is controllably operative to a prescribed sink loop current flowing through said telephone line, and wherein step (b) comprises, in response to detection of the flow of loop current, tuning off said controlled current source and said controlled current sink, and enabling signal amplification circuitry of each of said tip and ring amplifiers for the amplification of said telecommunication signals thereby.

26. The method according to claim 20, wherein step (b) comprises, in response to said telecommunication circuit device going off-hook, but prior to said tip and ring amplifiers being enabled for the amplification of telecommunication signals thereby, enabling loop current to flow through said telephone line from said source of loop current coupled thereto in step (a).

* * * * *